United States Patent [19]

Maus et al.

[11] Patent Number: 5,052,845
[45] Date of Patent: Oct. 1, 1991

[54] MULTI-LAYER SHAFT

[75] Inventors: Wolfgang Maus; Helmut Swars, both of Bergisch Gladbach, Fed. Rep. of Germany

[73] Assignee: Emitec Gesellschaft fur Emissionstechnologie mbH, Lohmar, Fed. Rep. of Germany

[21] Appl. No.: 295,297

[22] Filed: Jan. 10, 1989

[30] Foreign Application Priority Data

Jan. 14, 1988 [DE] Fed. Rep. of Germany ....... 3800913

[51] Int. Cl.⁵ .................... F16H 53/00; B29P 15/00
[52] U.S. Cl. .................... 403/36; 403/277; 74/567; 29/523; 29/888.1
[58] Field of Search ............ 403/277, 273, 34, 36, 403/274, 279, 284, 280, 282, 297; 29/523, 888.1; 74/567

[56] References Cited

U.S. PATENT DOCUMENTS

| 4,231,671 | 11/1980 | Makins, Jr. | 403/273 X |
| 4,264,229 | 4/1981 | Falk et al. | 403/297 X |
| 4,456,396 | 6/1984 | Damratowski | 403/34 X |
| 4,597,687 | 7/1986 | Cotas | 403/282 X |
| 4,620,454 | 11/1986 | Suginchi et al. | 403/277 X |
| 4,708,029 | 11/1987 | Urano | 29/523 X |
| 4,745,998 | 5/1988 | Stilin | 403/297 X |
| 4,750,250 | 6/1988 | Maus et al. | 29/888.1 |
| 4,867,004 | 9/1989 | Swars | 29/523 X |
| 4,875,270 | 10/1989 | Krips et al. | 29/523 X |
| 4,949,683 | 8/1990 | Swars | 74/567 X |

FOREIGN PATENT DOCUMENTS 8001193  6/1980  World Int. Prop. O. ............ 403/36

Primary Examiner—Peter M. Cuomo
Attorney, Agent, or Firm—Toren, McGeady & Associates

[57] ABSTRACT

For weight saving purposes and to make optimum use of the material there is provided a hollow shaft, to which drive elements such cams or end flanges are attached preferably by expanding the shaft in portions, made up of at least two layers including an outer layer, preferably produced of a material of a higher strength such as steel and an inner layer produced of a material of a lower strength, such as aluminum or titanium. If there are problems in achieving sufficiently secure fixing of the drive elements by expanding the hollow shaft in the regions to be expanded, it is possible to provide supporting rings which are deformed only plastically whereas the materials of the hollow shaft, as well as the drive elements themselves are deformed only elastically. The regions to be expanded are limited by seals on a pressure probe which is supplied with a pressurized fluid via a channel.

3 Claims, 1 Drawing Sheet

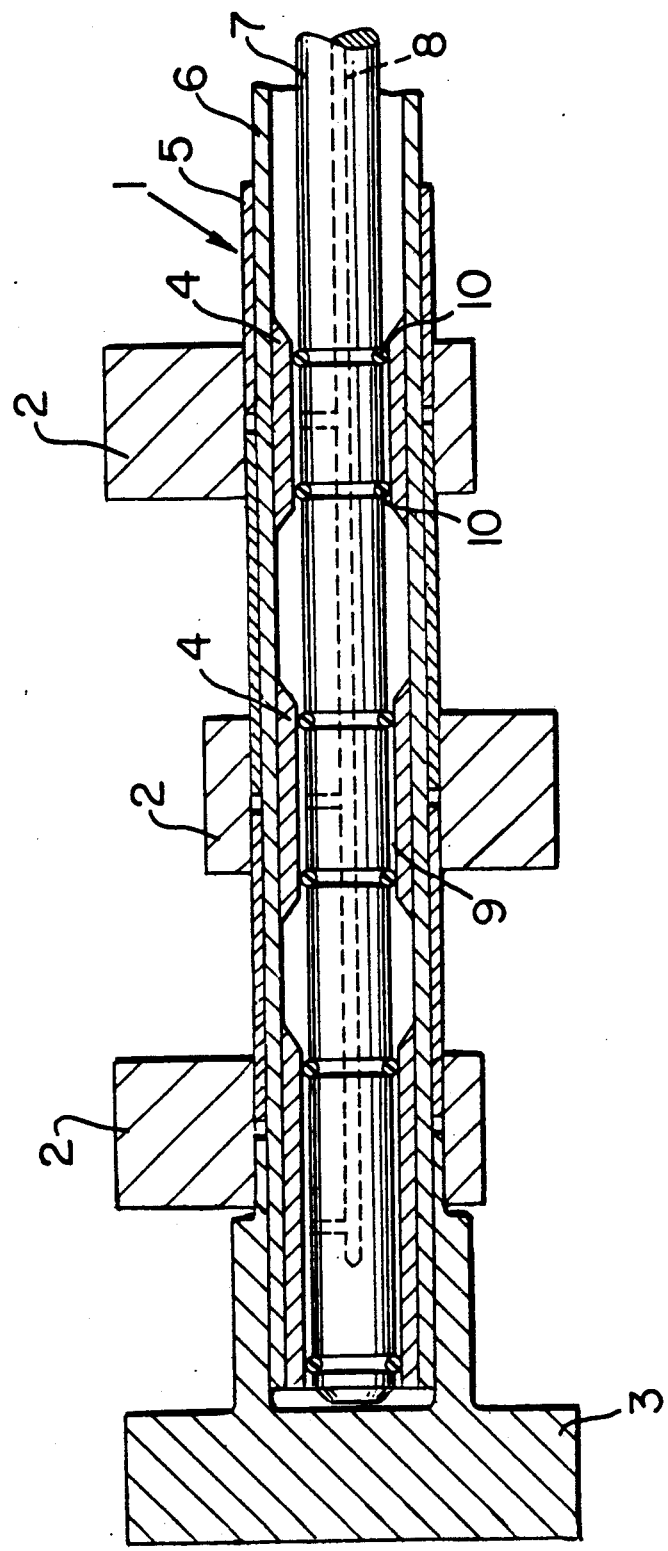

MULTI-LAYER SHAFT

BACKGROUND OF THE INVENTION

The present invention relates to a driveshaft having drive elements attached to it. In EP-A-0 213 529, there is proposed a process for attaching drive elements such as cams, gears or bearing bushes on a hollow shaft which consists of a commercial tube. The drive elements are slid onto the tube and attached to it by expanding the tube portions underneath, with the material of the tube itself being deformed plastically whereas that of the drive elements is deformed only elastically so that due to the spring-back of the latter a firm fit on the shaft is achieved. Furthermore, in unpublished German Patent Application P 36 33 435.9 and P 37 17 516.5 there are specified dimensioning rules according to which, as a function of the material properties of the tube and drive elements, and especially their modulus of elasticity and yield point, the geometric conditions, e.g. the inner and outer tube diameter have to be determined in order to achieve a non-rotating, force-locking connection between the parts. It has been found that if the invention, in particular, is applied to camshafts of motor vehicle engines, the component dimensions required by these dimensioning rules, for design or weight reasons, cannot always be made available. In the interest of a further reduction in weight, which is desirable anyway, it is also important to take into account that the radially outer layers of a hollow shaft generate a higher resistance moment vis-a-vis torsional loads than the inner layers.

SUMMARY OF THE INVENTION

It is thus an object of the present invention to improve the hollow driveshaft referred to above to the extent that a sufficiently safe attachment of the drive elements on the hollow shaft is achieved even in those cases where the dimensions of the shaft and drive elements do not permit the above-mentioned dimensioning rules to be observed. Furthermore, it is an object to ensure optimum utilization of the strength properties and materials selected in respect to torsional and bending loads.

Pursuant to this object, and others which will become apparent hereinafter, one aspect of the present invention resides in a hollow shaft comprised of at least two concentric layers. In most applications it will be sufficient for the hollow shaft to consist of two layers, but there are applications where a larger number of layers seems feasible, for instance, if materials are to be connected which otherwise cannot be connected or can only be connected with great difficulties, for instance, metal/plastics/metal or metal/ceramics/metal combinations.

In order to ensure that the drive elements are securely attached to the shaft it is necessary to effect plastic deformation of the latter over a certain minimum distance. Both from this point of view and from the point of view of optimum utilization of the resistance moments, it is recommended that the outer layers be heavier and stronger and the inner layer lighter and of lower strength. Material combinations which, taking into account all other requirements to be met by driveshafts, are likely to produce the best results as far as achieving the objective of the invention is concerned include an outer layer of hightensile steel and an inner layer of aluminum, titanium, plastic or inferior steel.

In a further embodiment, the shaft is produced by shrinking the outer layers onto the inner layers, thereby producing pretensions in the latter which first have to be reduced when the shaft portions carrying the drive elements are expanded at a later stage. This may be an advantage if the necessary rate of expansion would otherwise lead to higher stresses in the shaft.

As yet another alternative, it is proposed to expand the inner layers plastically into the outer layers, either in an independent operation or in connection with expanding the shaft for attaching the drive elements.

In respect of the composition of the driveshaft of the described type, in the case of which the hollow shaft is expanded only in those regions where the drive elements are to be attached, in a further embodiment all layers of the hollow shaft should be expanded plastically and only the drive elements themselves should be expanded merely elastically.

BRIEF DESCRIPTION OF THE DRAWING

The single FIGURE illustrates an axial longitudinal section through part of a camshaft pursuant to the present invention.

BRIEF DESCRIPTION OF THE DRAWING

As seen in the drawing, cams 2 and an end flange 3 are attached to a hollow shaft 1 in that the latter, from the inside, is expanded in those regions which, on the outside, are taken up by the drive elements (in this case cams 2 and the end flange 3). For weight saving purposes, the hollow shaft 1 may consist of an outer layer 5 produced of a material of a higher strength, e.g. steel, and an inner layer 6 produced of a material of a lower strength, e.g. aluminum. The strength and surface of the outer layer 5 may then be such that without any further machining it may be inserted into friction or roller bearings (not illustrated). Fixing the cams 2 and the end flange 3 is preferably effected in one operation by means of a hydraulic pressure probe which is inserted into the hollow shaft and in whose interior, via a channel 8 provided with branches, a pressure fluid may be supplied to regions 9 to be expanded which are axially limited by annular seals 10. The regions of the hollow shaft 1 in question are deformed plastically, whereas the cams 2 and the end flange 3 are deformed only elastically so that they spring back after completion of the expansion process, thereby producing a firm, force-locking connection between the parts. If the dimensions of the parts and their material properties do not permit a sufficient rate of expansion it is possible to provide supporting rings 4, with only these being deformed plastically, whereas at least some layers 5, 6 of the hollow shaft 1, as well as the drive elements 2, 3 are deformed only elastically.

While the invention has been illustrated and described as embodied in a hollow shaft, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A hollow shaft comprised of at least two longitudinally continuous concentric layers and having drive elements attached to said hollow shaft by friction locking, said at least two concentric layers including an outer layer of a higher strength material and an inner layer of a lower strength material, and said two concentric layers being under radial pretension against each other, said inner layer being plastically expanded into said outer layer so that the drive elements are attached to the hollow shaft, said inner and outer layers being in a friction locking connection only with each other along the entire length of said hollow shaft.

2. A hollow shaft comprised of at least two longitudinally continuous concentric layers and having drive elements attached to said hollow shaft by friction locking, said at least two concentric layers including an outer layer of a higher strength material and an inner layer of a lower strength material, and said two concentric layers being under radial pretension against each other, said inner layer and said outer layer being plastically deformed into elastically deformed drive elements so that the drive elements are attached thereby to the hollow shaft, said inner and outer layers being in a friction locking connection only with each other along the entire length of said hollow shaft.

3. A hollow shaft comprised of at least two longitudinally continuous concentric layers and having drive elements attached to said hollow shaft by friction locking, said at least two concentric layers including an outer layer of a higher strength material and an inner layer of a lower strength material, and said two concentric layers being under radial pretension against each other, and further comprising support rings provided inside the inner layer, said support rings being plastically deformable, and the drive elements and at least some of the at least two concentric layers being elastically deformable, said inner and outer layers being in a friction locking connection only with each other along the entire length of said hollow shaft.

* * * * *